United States Patent [19]

Yano et al.

[11] 4,313,648
[45] Feb. 2, 1982

[54] PATTERNED MULTI-LAYER STRUCTURE AND MANUFACTURING METHOD

[75] Inventors: Kensaku Yano, Yokohama; Kenji Takahashi, Sagamihara, both of Japan

[73] Assignee: Tokyo Shibaura Denki Kabushiki Kaisha, Kawasaki, Japan

[21] Appl. No.: 900,650

[22] Filed: Apr. 27, 1978

[30] Foreign Application Priority Data

Apr. 30, 1977 [JP] Japan ................... 52-49089

[51] Int. Cl.³ ................................. G02B 5/28
[52] U.S. Cl. ........................... 350/166; 204/192 EC; 204/192 E; 313/371; 428/696; 428/701; 427/165
[58] Field of Search ................ 204/192 E, 192 EC; 350/166, 164; 313/371; 156/643; 428/696, 699, 701; 427/164, 165

[56] References Cited

U.S. PATENT DOCUMENTS

| | | | |
|---|---|---|---|
| 3,743,586 | 7/1973 | Vossen | 204/192 E |
| 3,914,464 | 10/1975 | Thomasson et al. | 427/54 |
| 4,004,176 | 1/1977 | Otake et al. | 313/371 |
| 4,029,394 | 6/1977 | Araki | 350/166 |
| 4,030,967 | 6/1977 | Ingrey et al. | 156/643 |

FOREIGN PATENT DOCUMENTS 50-21050 7/1975 Japan.
51-105272 9/1976 Japan.
52-136525 11/1977 Japan.

OTHER PUBLICATIONS

H. Komiya et al., The Application of Gas Plasma ..., IEDM Technical Digest, 1973, pp. 459–462.
John Vossen and Werner Kern, *Thin Film Processes,* Academic Press, New York, pp. 497–498, 526–527, 535–543.
J. R. Gardiner et al., Al₂O₃ Protection of SI₃N₄ During RF Sputter Etching, IBM Technical Disclosure Bulletin, vol. 13, No. 12, p. 3657.

*Primary Examiner*—Delbert E. Gantz
*Assistant Examiner*—William Leader
*Attorney, Agent, or Firm*—Oblon, Fisher, Spivak, McClelland & Maier

[57] ABSTRACT

A patterned multi-layer structure for a stripe filter used for a photoelectric pickup tube, comprises a protective layer preventing a substrate from being etched by reactive sputter etching and a multi-layer optical filter formed on the protective layer patterned by reactive sputter etching into a stripe pattern.

The etching rate of the protective layer by an etching gas agent is not greater than that of the multi-layer filter.

11 Claims, 26 Drawing Figures

×400

×30,000

×30,000

×400

PATTERNED MULTI-LAYER STRUCTURE AND MANUFACTURING METHOD

BACKGROUND OF THE INVENTION

This invention relates to a patterned multi-layer structure formed by reactive sputter etching, especially to an optical filter comprised of a multi-layer filter structure and more particularly to a color separating stripe filter for a pickup device.

The basic color television camera system contains three photoelectric pickup devices which respectively pick up red, green and blue optical component signals from an object. To miniaturize the camera, a single tube or 2-tube color camera system is used. As the photosensitive pickup devices, a solid state device such as a CCD (charge coupled device) is utilized in lieu of a tube. When the camera system contains only one or two pickup devices as mentioned above, a stripe filter has to be located in front of the device. The stripe filter acts to separate red, green and blue components of the light from an object and to send these components to the pickup device to produce electric signals corresponding to the respective color components. There are various structures possible for the stripe filter. A typical example of a stripe filter is shown in FIG. 1. This filter is applied to a single tube color camera and has chromatic filter layers 11 and 12 on a transparent or semitransparent substrate such as a glass plate. The chromatic filter layer 11 which passes blue and green and reflects red is called a cyan filter. The chromatic filter layer 12 which passes green and red and reflects blue, is called a yellow filter. Therefore the crossing portions 13 at which the layer 11 and the layer 12 overlap each other can transmit green only. Symbols R, G and B denote respectively red, green and blue components which cam pass the respective portions. These chromatic filter layers need chemical and thermal stability to be applied to a pickup device such as a vidicon. So a material of high melting point such at $TiO_2$, $SiO_2$, $ZrO_2$, $Al_2O_3$ or $CeO_2$ is usually used for the components of these filters. High refractive index layers and low refractive index layers are alternately superimposed to and form a multi-layer optical filter structure in order to pass the desired chromatic light. Conventionally a reverse etching method is used to make such a stripe filter because it is difficult to etch directly a multi-layer structure composed of said high melting point materials after depositing it on a substrate. The reverse etching method is a method comprising the steps of forming a desired negative pattern of metallic film on a substrage, depositing a multi-layer filter structure on the metallic pattern, etching the metallic film with an etchant and removing mechanically the multi-layer structure applied to the metallic film. FIGS. 2a and 2b are a photograph and an enlarged perspective view of the stripe filter thus obtained. As seen from FIG. 2b, the upper edges 23 of the etched surfaces of the multi-layers 21 and 22 are not straight but zigzag shaped. The width of the stripes of the filter is about 17 microns for a ⅔ inch pickup tube. Tolerable amplitude (a) of zigzag to the stripe width W is represented by $$a = (1/10)w \qquad (1)$$

When a is larger than 1/10 of W, the noise becomes large and consequently it is difficult to get a clear picture. It is very hard to satisfy equation (1) by using reverse etching. Moreover the wet etching method used in reverse etching has some drawbacks contingent to metallic film evaporation and etching processes. Namely these drawbacks are as follows.

(1) Etching residue 31 (FIG. 3) of the metallic film 32 for the cyan filter or paar reverse etching which leaves the multi-layer to be removed occurs. FIGS. 3a and 3b are a photograph and its sketch of the etching residue of the metallic film. Reference numeral 33 denotes a striped yellow filter.

(2) Blots are often generated along the edges of the stripes owing to the reaction between the metalic film and the multi-layer filter structure because the substrate must be heated in the evaporation process for forming the multi-layer structure to stabilize the layer.

(3) Splashing occurs when the metallic film is evaporated. This metallic splashing causes scratches on the filter.

(4) Insufficient adhesion of the metallic film is easily caused by inadequate substrate temperature during the evaporation process which causes exfoliation of the film.

(5) The edges of the stripes are not straight because the shape of the edge line is determined by the grain size of the metallic stripes.

SUMMARY OF THE INVENTION

Accordingly an object of the present invention is to provide a patterned multi-layer structure whose roughness on the surface cut by etching is small.

Another object of the present invention is to provide a patterned multi-layer structure without non-uniformity of etching, blots or scratches, which often occurs in the wet etching method.

Still another object of the present invention is to provide a stripe filter having little noise and good color reproducibility.

To this end, in the present invention a reactive sputter etching method is used which comprises the steps of generating a plasma of a gaseous compound composed of carbon and halogen and/or hydrogen at a pressure between $1 \times 10^{-3}$ and $1 \times 10^{-1}$ Torr by applying a high frequency voltage between two parallel electrodes and etching with this activated gas plasma. When the gas pressure is higher than $1 \times 10^{-1}$ Torr, the mean free path of the gas molecule becomes short. As a result the directions of the moving gas molecules become random. The molecules therefore collide with the multi-layer structure from various directions, consequently, when a multi-layer structure comprising different materials whose etching rates differ from one another is etched, the roughness of the etched surface becomes large as shown in FIG. 4(a) and 4(B).

FIG. 4(a) is a SEM photograph of the etched cross-section and FIG. 4(b) is a sketch of the photograph. In FIG. 4(b) reference numeral 41 is a glass substrate, 42 is an aluminum oxide layer, 43 is an optical multi-layer filter and 44 is a metal resist layer. The cross-sectional surface to be exposed is very rough as shown in FIG. 4(b). This is called "side etching". On the contrary the mean free path of the reactive gas molecules is relatively long when the pressure is between $1 \times 10^{-3}$ and $1 \times 10^{-1}$ Torr. Thus most of the molecules collide with the layer to be etched in the direction perpendicular to the layer surface. Furthermore as the energy of the reactive gas molecules is larger than that of high pressure reactive gas molecules, physical sputtering effectively occurs. So the etching rate becomes higher as the result of the addition of chemical and physical etching. Particularly this effect is prominent when the pressure is in the range of $10^{-3}$ Torr.

An optical layer, especially a stripe filter, is made of materials having high melting points such as titanium oxide, silicon oxide, zirconium oxide, aluminum oxide, cerium oxide, lanthanum oxide, yttrium oxide, magnesium fluoride, cerium fluoride, lanthanum fluoride or zinc sulfide. It is very hard to etch these materials directly by a wet method. But reactive sputter etching enables easy etching of these materials and the cross-sectional surface of the multi-layer to be etched becomes smooth and nearly perpendicular to the substrate. However by the reactive sputter etching method, the etching is liable to go ahead into the substrate passing through the multi-layer. This is named overetching. To avoid the etching of the substrate, a protective layer having a smaller etching rate is interposed between the substrate and the multi-laminated film. The protective layer usually covers uniformly the whole surface of the substrate.

In order to etch the materials having high melting points mentioned above, the suitable pressure of the etching gas is of the order of $10^{-3\ 3}$ Torr particularly $1\times10^{-3}$ to $5\times10^{-3}$ Torr. As an impurity gas causes degradation of the etching rate, the partial pressure of the impurity gas must be lower than 1/5 of the total pressure. Because the reactive sputter etching method permits shortening the work time as compared with the inactive sputter method using an inactive gas such as argon, hardening of the resist usually caused by temperature rising of the material to be etched in this case and no crack in the material is generated.

DETAILED DESCRIPTION OF THE PREFERED EMBODIMENTS

Figure 1:
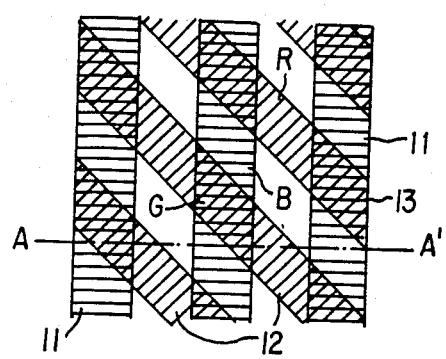
FIG. 1 is an enlarged front view of a typical stripe filter.
Figure 2A:
FIGS. 2(*a*) and 2(*b*) show respectively a photograph and its sketch of a stripe filter made by conventional reverse etching.
Figure 2B:
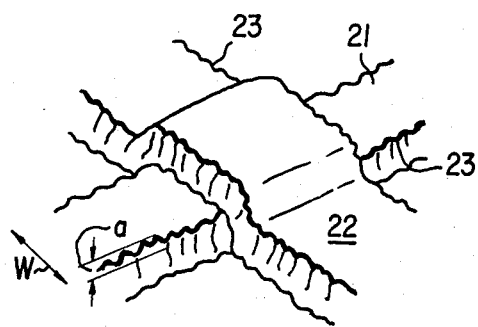
Figure 3A:
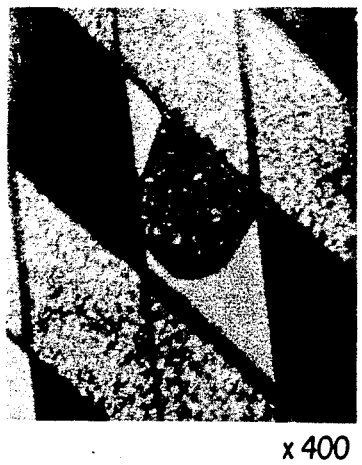
FIGS. 3(*a*) and 3(*b*) show respectively a photograph and its sketch of a stripe filter made by wet etching.
Figure 3B:
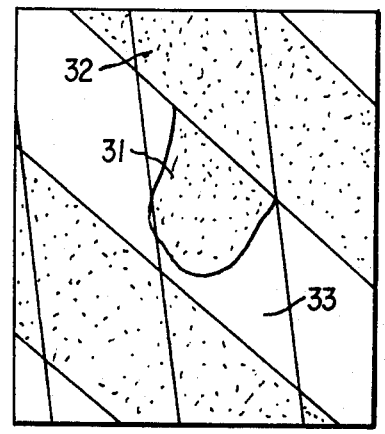

Referring to the drawings several embodiments of the present invention will be explained.

EXAMPLE I

Figure 7:
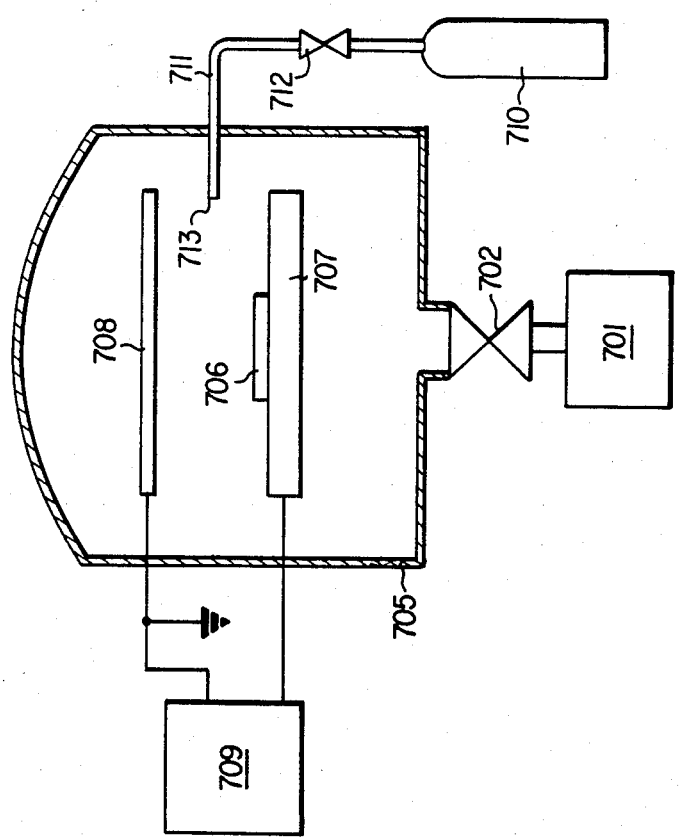
FIG. 7 shows a block diagram of a reactive sputter etching apparatus.
Figure 5:
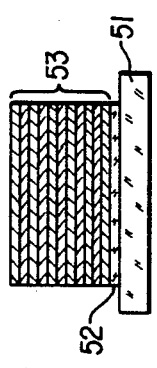
FIG. 5 shows the fundamental structure of a chromatic stripe filter.
Figure 6A:
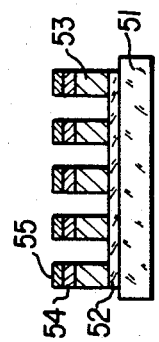
FIGS. 6(*a*) to FIG. 6(*f*) show the steps of the reactive sputter etching of an optical filter.
Figure 6B:
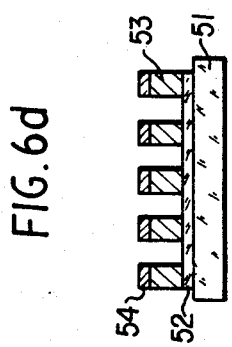
Figure 6C:
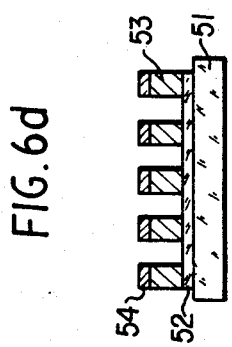

FIG. 5 shows the fundamental structure of a chromatic stripe filter having a multi-layer which is composed of alternately laminated films of $TiO_2$ and $SiO_2$. A transparent layer 52 of $Al_2O_3$ having an optical thickness of $\lambda/4$ ($\lambda$ denotes wavelength of the controlled light) is deposited on a substrate 51. Subsequently $TiO_2$ and $SiO_2$ each having an optical thickness of about $\lambda/4$ are alternately deposited to form an optical layer 53. The optical thickness is equal to the real thickness multiplied by its refractive index. The spectral transmittance of the filter may be changed by changing the optical thickness of $TiO_2$ and $SiO_2$. For example, if the thickness of $TiO_2$ is equal to about 500 Å and that of $SiO_2$ is equal to about 700 Å, the multi-layer cuts off the light of wavelength shorter than about 5000 Å. This is a yellow (Y) filter. If the thickness of $TiO_2$ is equal to about 750 Å, and that of $SiO_2$ is equal to about 1200 Å, the multi-layer cuts off the light with wavelength longer than about 5800 Å. This is called cyanic (C) filter. In a color pickup device for a TV system, the above mentioned Y or C filter or other chromatic filter is formed by a plurality of stripes having a predetermiend interval. As a substrate 51, a transparent glass plate consisting mainly of $SiO_2$ is used. It is essential that the etching should be stopped when it reaches the surface of the substrate. If not, the substrate is etched and consequently the properties of the filter such as spectral transmittance are deteriorated. To prevent the substrate from being etched, the deposition of an aluminum oxide ($Al_2O_3$) layer on the substrate is suitable, because $Al_2O_3$ has a high melting point and an extremely low etching rate. The fundamental stripe filter shown in FIG. 1 is manufactured by the processes shown in FIGS. 6*a* to 6*f*. In FIG. 6*a*, on a substrate 51 is deposited a protective layer 52 of aluminum oxide. Then an optical multi-layer 53 of $TiO_2$ and $SiO_2$ is formed on the protective layer 52. Subsequently a metal mask 54 of aluminum or chromium or other metal having a thickness of about 150 nanometers is dpeosited on the multi-layer 53. On top of the metal mask 54 is uniformly applied a positive resist 55 (e.g. AZ-1350J, a trade name of Shipley Co. U.S.A.) of about 2.7 microns in thickness. A resist pattern as shown in FIG. 6*b* is formed by exposing the resist 55 to light through a positive mask and removing the exposed area by a developer. Next as shown in FIG. 6*c*, the patterned metal mask 54 of chromium is formed by etching with a mixture of ceric ammonium nitrate $Ce(NO_3)_4.2NH_4NO_3.xH_2O$, perchloric acid $HClO_4$ and water at a room temperature for about 1 minute. The materials thus prepared are placed in a sputtering apparatus to be subjected to reactive sputter etching. FIG. 7 shows a block diagram of a sputter etching apparatus comprising a vacuum pump 701 to evacuate the inside of belljar 705 through a valve 702. In the belljar 705 are installed a target electrode 707 opposite the counter electrode at a predetermined distance. High frequency voltage is applied by a high frequency source 709 between the target electrode 707 and the counter electrode 708 which is grounded. A gas cylinder 710 is connected with the belljar 705 through a valve 712 and a connecting pipe 711. The tip 713 of the pipe 711 extends to the inside of the belljar 705 and acts as an ejecting nozzle. A reactive gas such as $CCl_2F_2$ is introduced into the belljar 705 from the gas cylinder 710 at a pressure between $1\times10^{-3}$ and $1\times10^{-1}$ Torr, more preferably of the order of $10^{-3}$ Torr after it has been exhausted to a high vacuum by the pump. Thereafter, high frequency energy is supplied between the target electrode 707 and the counter electrode 708 by means of the high frequency source 709 to generate a plasma. Thus reactive etching is carried out. Chemical reactions between the material to be etched and the plasma are as follow:

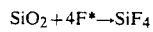

$$SiO_2 + 4F^* \rightarrow SiF_4$$

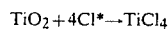

$$TiO_2 + 4Cl^* \rightarrow TiCl_4$$

Figure 6D:
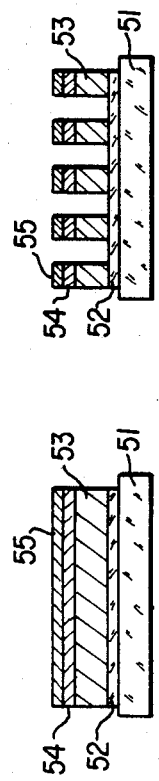
Figure 6E:
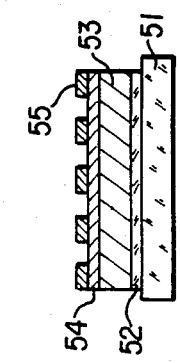
Figure 6F:
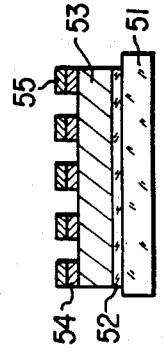

As the result, silicon tetrafluoride and titanium tetrachloride both having high vapor pressure are generated. $F^*$ and $Cl^*$ mean radicals of fluorine and chlorine respectively. Anions of $F^-$ and $Cl^-$ are generated in the plasma. These anions collide with the materials to be etched with energies elevated by the high frequency voltage. Thus anions not only react chemically with $SiO_2$ and $TiO_2$ instead of $F^*$ and $Cl^*$ but also sputter the filter compounds $SiO_2$ and $TiO_2$ and materials $SiF_4$ or $TiO_4$ formed by the reaction. Consequently the etching rate is increased because physical sputtering is added to chemical reaction. After 30 minutes of the operation the reactive sputter etching is finished as shown in FIG. 6(d). Then 0.1 Torr of oxygen is introduced into the sputtering apparatus and etching is carried out to remove the photo resist layer 55 as shown in FIG. 6(e). Finally the chromium mask is removed by the same wet etching of metal mentioned in FIG. 6c and a striped optical multi-layer structure is completed as shown in FIG. 6(f). By inserting a metal mask 54 between an optical multi-layer 53 and a photo resist 55, the accuracy of the etching can be improved. Namely, as the resist mask is gradually eroded owing to the increased temperature of the material during the sputter etching, the mask is broken off partially. This erosion increases as the etching rate is increased. The edge portions of the mask are particularly liable to be eroded. Therefore by inserting a mask having relatively small etching rate such as aluminum or chromium the erosion is sufficiently prevented and the accuracy of the etching is maintained.

Figure 4A:
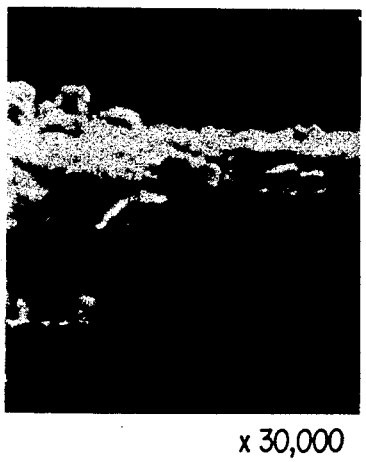
FIGS. 4(*a*) and 4(*b*) show respectively a photograph and its sketch of a stripe filter made by reactive plasma sputtering at a higher pressure.
Figure 4B:
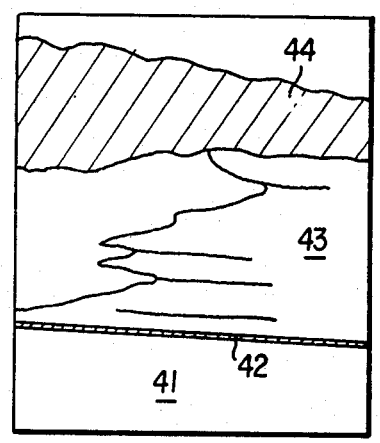
Figure 8A:
FIGS. 8(*a*) and 8(*b*) show respectively an SEM photograph and its sketch of an etched cross-section formed by reactive sputter etching.
Figure 8B:
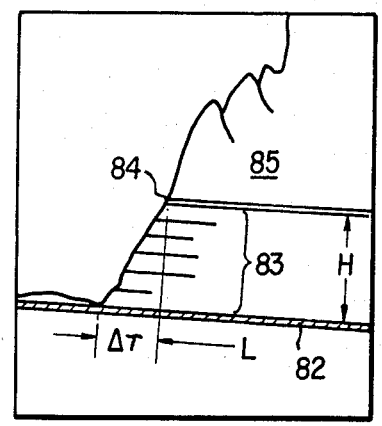
Figure 9A:
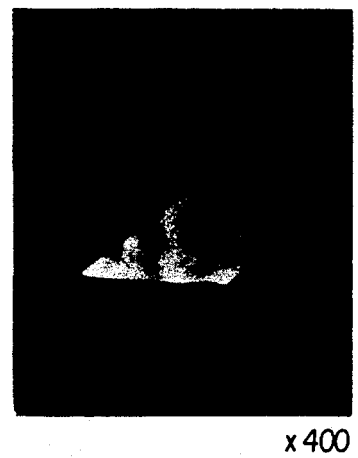
FIGS. 9(*a*) and 9(*b*) show respectively an SEM photograph and its sketch of a front view of the reactive sputter etched filter.
Figure 9B:
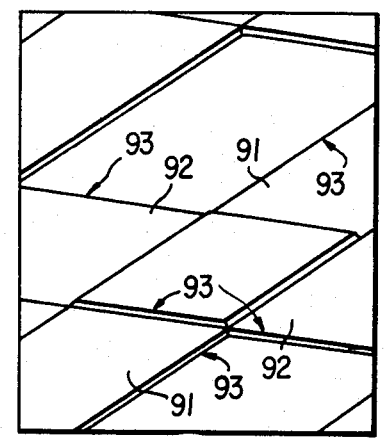

FIG. 8(a) is a photograph showing the etched material just before completion of the etching by magnifying with a scanning electron microscope of 30,000 magnification. FIG. 8(b) is a sketch for explaining the structure of the etched material shown in FIG. 8(a). FIG. 8 is a cross-section viewed from the direction parallel to the stripe. In FIG. 8(b), reference numeral 81 is a glass substrate, 82 is a protective layer of aluminum oxide, 83 is an optical multi-layer, 84 is a metal mask and 85 is an organic resist layer. The irregularity of the etched lines has almost vanished and the horizontal difference $\Delta T$ between the bottom layer and the top layer is only 0.3 micron. This is greatly different from the case shown in FIG. 4. The thicknesses H of yellow and cyan filters are about 0.7 and 1.1 micron respectively. The angle between the etched cross-sectional surface and the substrate is smaller than 65°. The width L of the stripe is about 17 microns for both filters so that the difference $\Delta T$ mentioned above is sufficiently small and does not affect the spectral properties of the filter. Moreover mechanical stability is remarkably improved. Namely, partial defect of the filter hardly occurs. When galss or resin was coated over the surface of the stripe filter to make it smooth, the occurrence of cracks in the coated layer decreased. A front view of the etched filter by a scanning electron microscope is shown in FIG. 9. Upper edge lines 93 of the cross-sectional etched surface have roughness of about 0.3 micron which is smaller than 1/10 of the stripe width of 17 microns. Of course all kinds of roughness in the cross-sectional etched surface are smaller than the thickness of each film forming the stripe filter. Reference numerals 91 and 92 denote a yellow filter and a cyan filter respectively. The stripe filter thus obtained has low noise when used for a pickup device. As the continuous aluminum oxide layer on the substrate functions well as the protective layer, the etching time need not be controlled strictly. Both the accuracy and the etching rate by this etching method are improved as compared with conventional sputter etching using unreactive gas. For example, it takes more than 60 minutes to etch a material having the structure shown in FIG. 6 using unreactive gas.

EXAMPLE II

Figure 10A:
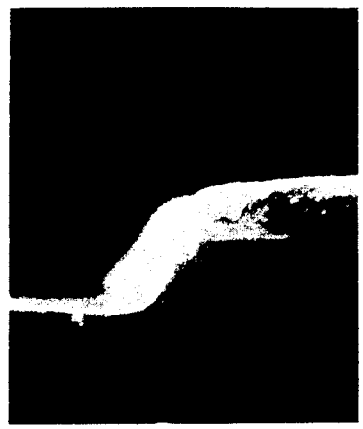
FIGS. 10(*a*) and 10(*b*) show respectively an SEM photograph and its sketch of an etched cross section formed by reactive sputter etching covering an organic resist.
Figure 10B:
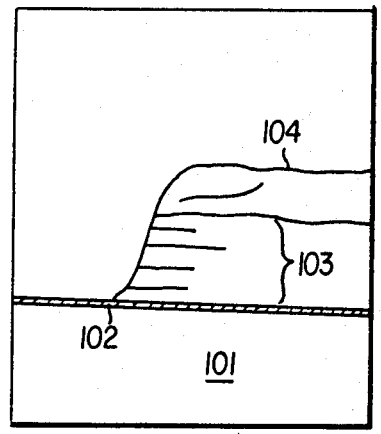

Gas pressure of the order of $10^{-3}$ Torr is used. The etching rate of the resist rapidly decreases when the pressure is lowered upto an extent of $10^{-3}$ Torr. Etching rate of the resist becomes only 2 times as large as that of the optical multi-layer in $3\times10^{-3}$ Torr of dichlorodifluoromethane ($CCl_2F_2$). Accordingly direct etching can be carried out without a metal mask by increasing the thickness of the resist layer to 2 times or more of that of the optical multi-layer. Thus the etching process is simplified. As etching can be carried out at low power density of about 0.5 W/cm², the resist is hardly heated and consequently hardening thereof scarcely occurs. Removing of the resist is therefore very easy by a method such as dipping in acetone. Of course the resist removing can be achieved by means of etching in an atmosphere of oxygen as mentioned in example I. The stripe filter thus obtained is shown in FIG. 10(a) and FIG. 10(b). FIG. 10(a) is an SEM photograph of a cross-sectional view of a filter and FIG. 10(b) is an explanatory figure for the FIG. 10(a). In FIG. 10(B), 101 is aglass substrate, 102 is a protective layer, 103 is an optical multi-layer and 104 is an organic resist layer.

EXAMPLE III

Figure 11:
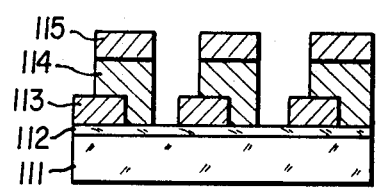
FIG. 11 shows an A-A' cross-section of the stripe filter shown in FIG. 1.

FIG. 11 shows an A–A' cross-section of the stripe filter shown in FIG. 1. This filter is prepared as follows: First, protective layer 112 is deposited on a substrate 111. Next, on the protective layer 112 is formed a first filter layer 113 (e.g. yellow filter) which is patterned by reactive sputter etching. The etching is stopped at the protective layer. A second filter layer 114 (e.g. cyan filter) is formed on the first filter layer 113. This layer 114 is also patterned by the same method. Before the etching the surface of the second filter is covered with resist 115 in a stripe shaped pattern which intersects the first stripes at a predetermined angle. The etching of the second filter layer must be stopped at the upper surface of the first filter layer without over-etching to preserve the spectral characteristics of the first filter as predetermined. Thus it is desirable that the top layer of the first filter be a second protective layer 116. The second protective layer may be formed as the last layer of the first filter layer (FIG. 12) or before the evaporation of the second filter layer (FIG. 13). The second protective layer is denoted by numeral 117 in FIG. 13. Naturally the protective layer interposed between the first and the second filters is a component of the stripe filter. When the second protective layer is formed on the first filter layer, it must be etched for patterning the first filter. This raises a new problem because the protective layer is not easily etched under the above mentioned conditions. Next example will show this solution of the problem.

EXAMPLE IV

Figure 12:
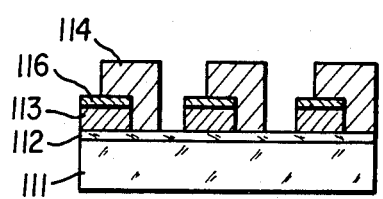
FIGS. 12 and 13 show examples of optical filters having second protection layers.
Figure 13:
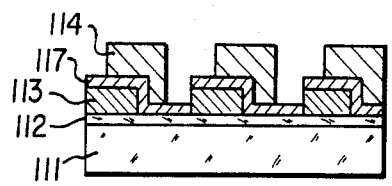
Figure 14:
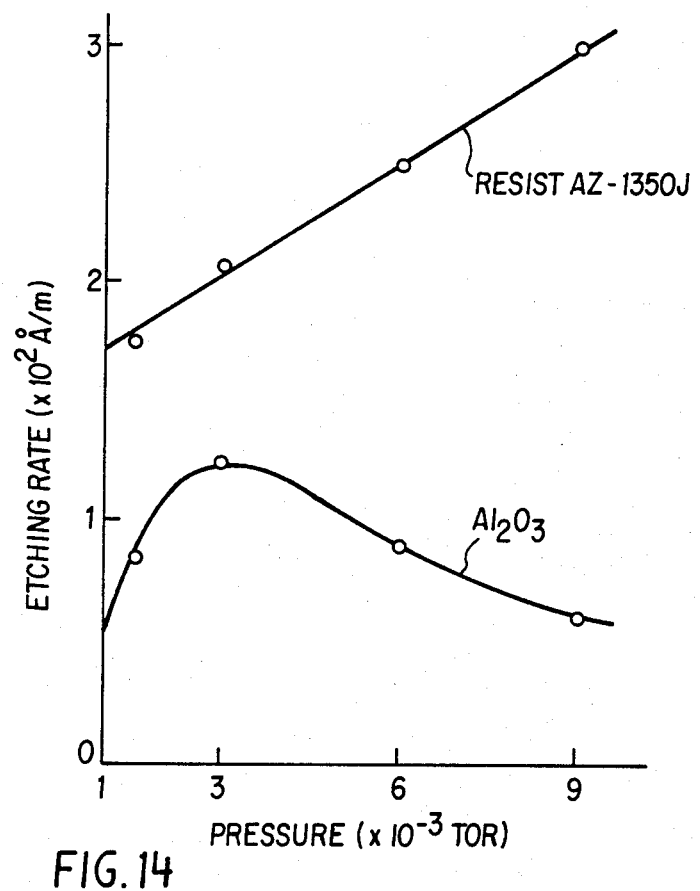
FIG. 14 shows etching rates of aluminum oxide and organic resist as a function of the atmospheric pressure.

In the filter structure as shown in FIG. 12, the second protective layer 116 formed on the top surface of the first multi-layer 113 is of aluminum oxide. In this case the second protective layer must be etched together with the first filter. In $CCl_2F_2$ gas pressure of the order of $10^{-3}$ Torr, especially from $1 \times 10^{-3}$ to $5 \times 10^{-3}$ Torr, the etching rate of aluminum oxide becomes as large as about one third of that of the organic resist layer. The etching rates of aluminum oxide and organic resist under various pressures of $CCl_2F_2$ are shown in FIG. 14. The second protective layer 116 in FIG. 12 is etched by the reactive sputter method under the $CCl_2F_2$ gas atmosphere at a pressure of $3 \times 10^{-3}$ Torr and is stripe-patterned, under such conditions the second protective layer 116 is etched quickly and subsequently the multi-layer of titanium and silicon oxide under the protective layer is etched in a stripe pattern. Immediately before the first protective layer 112 is exposed to reactive gas, the gas atmospheric pressure is altered to $10^{-2}$ Torr. Thereby the first protective layer 112 of aluminum oxide is almost prevented from reactive sputter etching, and a good optical filter can be obtained.

EXAMPLE V

In FIG. 12, the top surface of the second filter layer 114 was aluminum oxide. This was necessary to gain good performance for an optical filter. The etching conditions were applied selectively. The etching of the second filter near the top surface of aluminum oxide was carried out under the atmospheric pressure of $1 \times 10^{-3}$ to $5 \times 10^{-3}$ Torr and subsequently the successive layers of the second filter was etched by $CCl_2F_2$ under the atmospheric pressure of $10^{-2}$ Torr.

EXAMPLE VI

The protective layer was made of at least one material selected from the group consisting of zirconium oxide, cerium oxide, cerium fluoride, thorium oxide, praseodymium oxide, lanthanum oxide and lanthanum fluoride instead of aluminum oxide as in Example IV. These materials function effectively as a protective layer against reactive sputter etching.

EXAMPLE VII

On the stripe filter manufactured in Examples III to V, the photoconductive materials were evaporated and the filter structure was installed in a pickup tube such as a vidicon. This shows a good reproducibility of color and low noise performance.

EXAMPLE VIII

Figure 15:
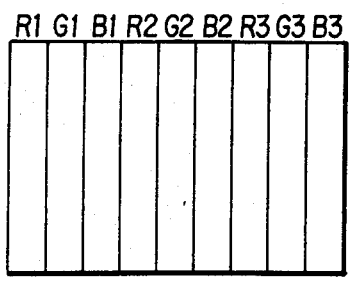
FIG. 15 shows a stripe filter having three kinds of filters which are substantially parallel with each other.

As shown in FIG. 15, on the substrate having a protective layer there were formed a plurality of striped filters $R_1, R_2, R_3, \ldots$ which pass only red light, a plurality of striped filters $G_1, G_2, G_3 \ldots$ which pass only green light and a plurality of striped filters $B_1, B_2, B_3, \ldots$ which pass only blue light. They were substantially parallel to each other. The stripe filter having three kinds of stripes was located at the front face of a pickup tube or a solid state pickup device such as a CCD. They produced good quality pictures.

Good results were also obtained when the multi-layer structure of this invention was applied to devices other than the pickup devices. For example, in an electrochromic display device or a semi-conductor device a patterned electrode was conveniently prepared by the etching method of this invention. Therefore applications of the present invention are not restricted to the field of optical filters.

What we claim is:

1. A manufacturing method for a patterned multi-layer article comprising the steps of:
   forming on a substrate a protective layer comprising at least one refractory material selected from the group consisting of aluminum oxide, zirconium oxide, cerium oxide, cerium fluoride, thorium oxide, praseodymium chloride, praseodymium oxide, lanthanum oxide and lanthanum fluoride, which is resistant to reactive sputter etching;
   forming on the protective layer a laminated layer having laminae composed of silicon oxide and titanium oxide, said silicon oxide and titanium oxide being etched at different rates by reactive sputter etching; and
   etching the laminated layer by reactive sputter etching to form a predetermined pattern.

2. A manufacturing method according to claim 1, wherein a reactive gas for the etching step contains a chlorine or fluorine compound.

3. A manufacturing method according to claim 2, wherein the reactive gas contains dichlorodifluoromethane.

4. A manufacturing method according to claim 2, wherein the reactive gas contains carbon tetrachloride.

5. A manufacturing method according to claim 1, wherein the atmospheric pressure in the reactive sputter etching step is $1 \times 10^{-3}$ to $1 \times 10^{-1}$ Torr.

6. A manufacturing method according to claim 5, wherein the atmospheric pressure is $1 \times 10^{-3}$ to $5 \times 10^{-3}$ Torr.

7. A patterned optical multi-layer article comprising:
   a substrate;
   a protective layer comprising at least one refractory material selected from the group consisting of aluminum oxide, zirconium oxide, cerium oxide, cerium fluoride, thorium oxide, praseodymium chloride, praseodymium oxide, lanthanum oxide and lanthanum fluoride formed on the surface of the substrate; and
   at least one laminated and patterned layer formed on the surface of said protective layer and having laminae composed of silicon oxide and titanium oxide, said silicon oxide and titanium oxide having different refractive indices,
   wherein said protective layer and said laminated and patterned layer constitute an optical filter, and said protective layer prevents said substrate from being etched by reactive sputter etching.

8. A patterned optical multi-layer article according to claim 7, wherein said optical filter comprises a first laminated and stripe patterned layer and a second laminated and stripe patterned layer deposited on the surface of said first stripe patterned layer and on the surface of said protective layer, said first and second stripe patterned layers crossing each other.

9. A patterned optical multi-layer article according to claim 8, wherein said optical filter further comprises a second protective layer interposed beween said first and second stripe patterned layers, said second protective layer preventing the first stripe patterned layer from being etched by reactive sputter etching.

10. A patterned optical multi-layer article according to claim 7, wherein said protective layer is made of aluminum oxide.

11. A patterned optical multi-layer article according to claim 7, wherein the optical filter comprises three stripe filter layers, whose stripes are parallel with each other.

* * * * *